(12) United States Patent
Aschaber et al.

(10) Patent No.: US 8,840,167 B2
(45) Date of Patent: Sep. 23, 2014

(54) MOTOR VEHICLE WITH A SEAT BENCH

(71) Applicant: MAGNA STEYR Fahrzeugtechnik AG & Co. KG, Graz (AT)

(72) Inventors: Christoph Aschaber, Graz (AT); Thomas Auer, Metnitz (AT); Manuel Erlacher, Radenthein (AT); Martin Rodler, Krottendorf (AT); Harald Zachnegger, Graz (AT)

(73) Assignee: MAGNA STEYR Fahrzeugtechnik AG & Co KG, Graz (AT)

( * ) Notice: Subject to any disclaimer, the term of this patent is extended or adjusted under 35 U.S.C. 154(b) by 0 days.

(21) Appl. No.: 13/763,984

(22) Filed: Feb. 11, 2013

(65) Prior Publication Data

US 2013/0207430 A1 Aug. 15, 2013

(30) Foreign Application Priority Data

Feb. 10, 2012 (EP) ..................... 12154891

(51) Int. Cl.
*B60N 2/02* (2006.01)
*B60N 2/00* (2006.01)
*B60R 21/02* (2006.01)
*B60N 2/32* (2006.01)
*B60N 2/30* (2006.01)

(52) U.S. Cl.
CPC .. *B60N 2/02* (2013.01); *B60N 2/00* (2013.01); *B60R 21/026* (2013.01); *B60N 2/32* (2013.01); *B60N 2/3065* (2013.01); *B60N 2/3027* (2013.01)
USPC ....................... 296/65.01; 297/353

(58) Field of Classification Search
CPC ...... B60N 2/02; B60N 2/3027; B60N 2/3065; B60N 2/32; B60N 2/00
USPC ..................... 296/65.01; 297/353
See application file for complete search history.

(56) References Cited

U.S. PATENT DOCUMENTS

| 6,257,653 | B1 * | 7/2001 | Swersky | 296/180.1 |
| 6,260,903 | B1 * | 7/2001 | von der Heyde | 296/24.46 |
| 6,460,926 | B1 * | 10/2002 | Neale | 297/216.12 |

* cited by examiner

*Primary Examiner* — Lori Lyjak
(74) *Attorney, Agent, or Firm* — Jordan IP Law, LLC; Todd A. Vaughn

(57) ABSTRACT

Motor vehicle with a seat bench which comprises a seat surface which is approximately horizontal in a normal position and a backrest which is approximately vertical in the normal position, wherein the backrest comprises at least one transparent region which is designed in such a manner that the view from a region in front of the backrest in the direction of travel into a region behind the backrest in the direction of travel is made possible.

20 Claims, 6 Drawing Sheets

MOTOR VEHICLE WITH A SEAT BENCH

CROSS-REFERENCE TO RELATED APPLICATIONS

The present application claims priority under 35 U.S.C. §119 to European Patent Application No. EP EP 12154891.1 (filed on (Feb. 10, 2012), which is hereby incorporated by reference in its entirety.

TECHNICAL FIELD

Embodiments relate to a motor vehicle with a seat bench which comprises a seat surface which is approximately horizontal in a normal position and a backrest which is approximately vertical in the normal position.

BACKGROUND

Seat benches for motor vehicles having a seat surface and a back rest are generally known.

In particular, the view of an occupant located in front of the seat bench in the direction of travel of the motor vehicle, for example, of the motor vehicle driver, of regions behind the seat bench, in particular into a loading compartment or boot space, is obstructed or made impossible by the backrest of a seat bench of this type.

SUMMARY

Embodiments are related to a motor vehicle with a seat bench permitting both comfortable sitting on the seat bench and a good view from a front region into a rear region in the motor vehicle in a simple and cost-effective manner.

Embodiments are related to a motor vehicle with a seat bench which includes at least one of the following: a seat surface which is approximately horizontal in a normal position and a backrest which is approximately vertical in the normal position, in which the backrest comprises at least one transparent region which is designed in such a manner that the view from a region in front of the backrest in the direction of travel into a region behind the backrest in the direction of travel is made possible.

The region in front of the backrest in the driving direction is customarily the front interior space of the motor vehicle, in which the driver and possibly one or more occupants are located on front seats in the vehicle. The region behind the backrest is customarily a boot space or else a loading compartment which, for example, is open.

In accordance with embodiments, advantageously the view from the front space into the rear space is undertaken through the transparent region of the backrest. For this purpose, the transparent region of the backrest is designed to be at least of a size such that a not inconsiderable part of the rear region in the direction of travel can be seen into.

In accordance with embodiments, advantageously, the view into the rear vehicle region, i.e., for example, into the loading compartment, is possible even if the view into the rear region is particularly impaired because of the dimensions or arrangement of the backrest. By way of the transparent design of a region of the backrest, although said region serves as a delimitation in relation to the rear region, for example, a boot space or else an open loading surface, in order thereby, for example, to act as protection against noise and dirt from the rear region, said region additionally permits the view into the rear region of the motor vehicle, which region can only be seen into with difficulty, if at all, without the transparent region of the backrest.

In accordance with embodiments, the backrest preferably comprises a backrest rear wall, and the backrest rear wall is formed from transparent material, in particular from glass or plastic, in the at least one transparent region. The backrest thereby provides the rigidity of a backrest rear wall that nevertheless makes it possible to look into the region behind the backrest.

In accordance with embodiments, the backrest rear wall comprises a transparent honeycomb core in the at least one transparent region. By way of the use of a sandwich structure with a honeycomb core, it is possible to form a transparent and nevertheless highly loadable backrest rear wall.

In accordance with embodiments, the backrest preferably comprises upholstery. The backrest is formed only by the backrest rear wall in the at least one transparent region. That is to say, the backrest does not comprise any upholstery in the at least one transparent region. The protective effect in relation to the region behind the backrest is ensured by the backrest rear wall alone. The transparency is ensured by a transparent backrest rear wall. In this case, individuals on the seat bench preferably do not sit in the region without upholstery.

In accordance with embodiments, the upholstery is configured to be removable, in particular can be folded away. For example, the upholstery can be folded away forward in the direction of travel or else can be pulled out forwards, in the at least one transparent region. In this way, even in the case of an opaque design of the upholstery, a transparent region is produced in the backrest as soon as the upholstery is removed or folded away.

In accordance with embodiments, the upholstery is formed by a transparent, in particular air-filled cushion, in the at least one transparent region. This makes it possible to see through the partition without removing the upholstery or part of the upholstery.

In accordance with embodiments, the backrest is configured in such a manner that the backrest, at least in a partition position, forms a partition which separates the region behind the backrest in the direction of travel from the region in front of the backrest in the direction of travel. The backrest can thus be designed in such a manner that it has a greater separating effect between the region in front of the backrest and the region behind the backrest than conventional backrests, in particular by the backrest being of such large dimensions or being deformable, for example extendable to such an extent that the majority of the interior space of the motor vehicle is covered by the backrest. By way of a backrest designed in such a manner, the view into the rear regions of the vehicle would be made particularly difficult, but is made possible by the transparent region in the backrest.

In accordance with embodiments, the seat surface and the backrest are adjustable into a partition position in which the seat surface and the backrest adopt an at least approximately vertical position and the backrest is arranged above the seat surface such that the backrest together with the seat surface forms a partition which separates the region behind the partition in the direction of travel from the region in front of the partition in the direction of travel.

In accordance with embodiments, the backrest and the seat surface are adjustable, for example, pivotable, in such a manner that they can both be brought into an approximately vertical position in relation to the roof and/or floor of the motor vehicle. In the vertical position, the rear side of the backrest and the lower side of the seat surface are oriented to the rear in the direction of travel. The backrest and seat surface together form a partition such that the view behind the partition is made possible by the transparent region in the backrest.

In accordance with embodiments, the upper edge of the backrest is preferably in contact with the roof of the motor vehicle. The backrest or the backrest and the seat surface are geometrically designed in such a manner that the upper edge of the backrest reaches the roof of the motor vehicle on the inside thereof in the partition position, i.e., is customarily directly connected to a roof lining. Indirect contact with the roof lining may also take place via flat intermediate elements, such as, for example, sealing lips. The partition which includes the backrest and seat surface substantially separates the entire height of the interior space of the motor vehicle, from the floor as far as the roof.

In accordance with embodiments, the backrest is mounted pivotably on the seat surface via a first pivot axis in the rear region of the seat surface and the seat surface is mounted pivotably on the vehicle frame via a second pivot axis in the front region of the seat surface, and the seat surface and the backrest are pivotable about the first and second pivot axes into the partition position. Such an arrangement of pivot axes constitutes a cost-effective adjustment mechanism for adjusting the backrest and the seat surface in the abovementioned vertical positions of the partition position. In addition, in the normal position, the first pivot axis may also be used to adjust the inclination of the backrest in such a manner that comfortable sitting in a manner meeting the individual requirements of a vehicle occupant on the seat bench is made possible.

In accordance with embodiments, the upper edge of the backrest extends over the entire width of the roof of the motor vehicle, and the backrest upper edge is in direct or indirect contact over the entire width with the roof of the motor vehicle in the partition position. The backrest upper edge therefore substantially covers the entire width of the motor vehicle in the region of the roof lining, thus ensuring better separation.

In accordance with embodiments, the seat surface and the backrest are preferably designed in such a manner that the partition covers the entire cross section of the motor vehicle in the partition position. The partition, which is formed from the backrest and the seat surface, therefore reaches both in height from the floor as far as the ceiling of the vehicle and in width from one side of the vehicle as far as the opposite side, from a B pillar as far as the opposite B pillar, for example. The seat surface and the backrest are shaped in such a manner that the contour of the partition substantially corresponds to the contour of the vehicle interior space and, as a result, covers the entire cross section. This ensures an optimum separating effect of the partition.

In accordance with embodiments, at least one sealing element is arranged in the interior space of the motor vehicle, said sealing element sealing a contact region between the partition and the motor vehicle in the partition position. In a particularly preferred manner, one or more sealing elements are arranged over relatively large sections or over the entire contour of the connecting lines between the partition and motor vehicle. Sealing lips in particular can be used as the sealing elements.

In accordance with embodiments, the partition separates the region behind the partition in the direction of travel from the region in front of the partition in the direction of travel in an approximately soundproof, hermetic (watertight) and/or airtight manner in the partition position. The backrest, seat surface and possible sealing elements are therefore advantageously designed in such a manner that the front interior space is protected in the best possible manner from the region behind the partition, in particular in respect of noise, wind or ingress of water from the rear region.

In accordance with embodiments, in an advantageous manner, at least one fixing element is arranged in the interior space of the motor vehicle, said fixing element being designed to fix the backrest and/or the seat surface in the at least approximately vertical position to the motor vehicle in the partition position. This ensures secure holding of the partition in the upright position even while underway.

In accordance with embodiments, the roof of the motor vehicle comprises a removable, and/or displaceable, and/or foldable roof element which lies behind the partition in the direction of travel in the partition position of the seat bench. A rear part of the roof is therefore removable and/or displaceable and/or foldable in a forward and/or rearward direction as a whole or in segments, for example, as in the case of a known sliding folding roof. In this way, by erecting the seat surface and backrest to form the partition position and removing or displacing or folding the rear roof element, a vehicle having a loading surface which is open at the rear, corresponding to a known pick up is produced.

In accordance with embodiments, a flat loading floor element which, in the normal position of the seat bench, is substantially located under the seat surface is raised in the partition position of the seat bench such that the loading floor element lies in one plane with a loading floor of the motor vehicle in the partition position. A loading floor element which is flat, is designed as a panel and, in the normal position, is located under the seat surface, customarily in a seat bench trough and, as a result, is located below the level of a loading floor in the rear vehicle region, can be raised in such a manner that it comes to lie on the level of the loading floor in the partition position. This results in an enlargement of the loading floor or in a continuously flat loading floor which reaches as far as the partition.

In accordance with embodiments, the seat surface and the backrest are preferably adjustable, in particular pivotable, into the partition position via a servomotor. In this way, a manual adjustment of the seat bench is not required in order to form the partition.

In accordance with embodiments, the loading floor element can also be raised automatically via the servomotor. In particular, the loading floor element is raised via the servomotor at the same time as the seat surface and the backrest are also adjusted, in particular pivoted, into the partition position, preferably via the same servomotor. In this way, the partition can be erected and the loading floor extended at the same time without effort. Of course, the loading floor element may also be raised automatically via a second servomotor which is different from the servomotor for adjusting the seat surface and backrest.

Embodiments are related to a motor vehicle with a seat bench which includes at least one of the following: a seat bench having a seat surface which lies in an approximately horizontal plane in a normal position and a backrest which lies in an approximately vertical plane in the normal position, the backrest having at least one transparent region configured to permit an occupant at a first region of the motor vehicle in front of the backrest in a direction of travel of the motor vehicle to view a second region of the motor vehicle behind the backrest in the direction of travel of the motor vehicle.

DRAWINGS

Embodiments are described by way of example below with reference to the drawings.

DESCRIPTION

Figure 1:
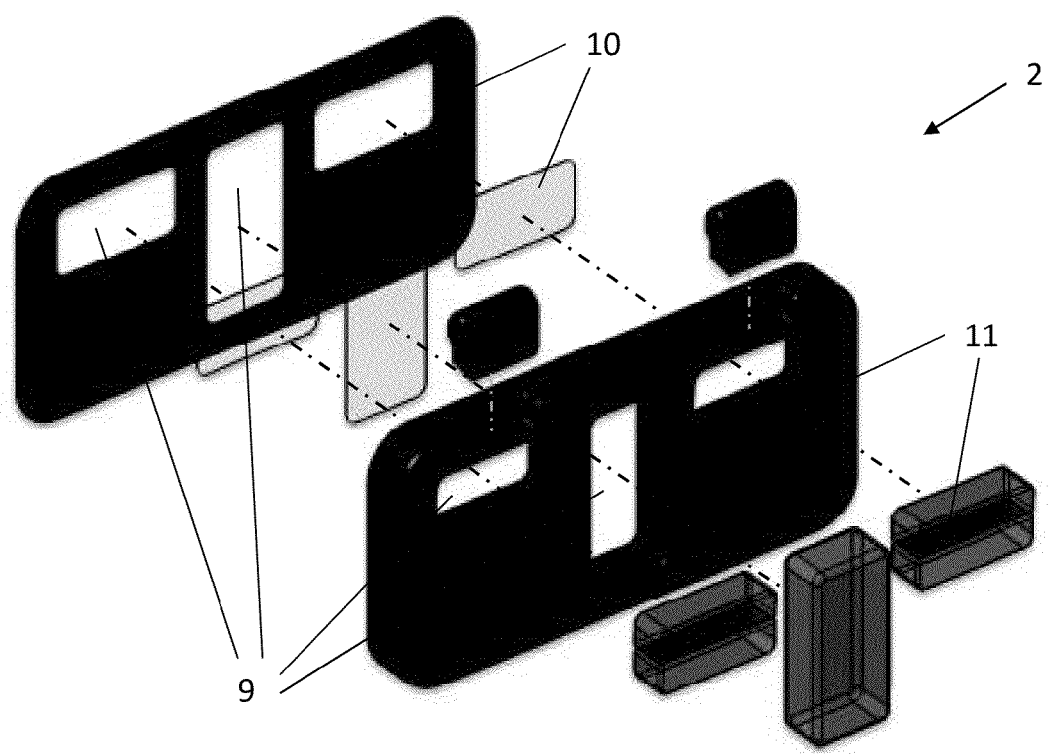
FIG. 1 illustrates a 3-dimensional exploded illustration of the backrest of a seat bench in accordance with embodiments.

FIG. 1 illustrates the backrest 2 of a seat bench in accordance with embodiments in an exploded illustration. The backrest 2 includes of a backrest rear wall 10. A region in the central part and two lateral regions of the backrest rear wall 10 are designed as transparent regions 9. The backrest rear wall 10 is formed in said regions by separate transparent panels, for example by transparent plastic. The upholstery 11 in the same transparent regions 9 likewise has separate upholstery which is of transparent design.

Figures 2, 3, 4:
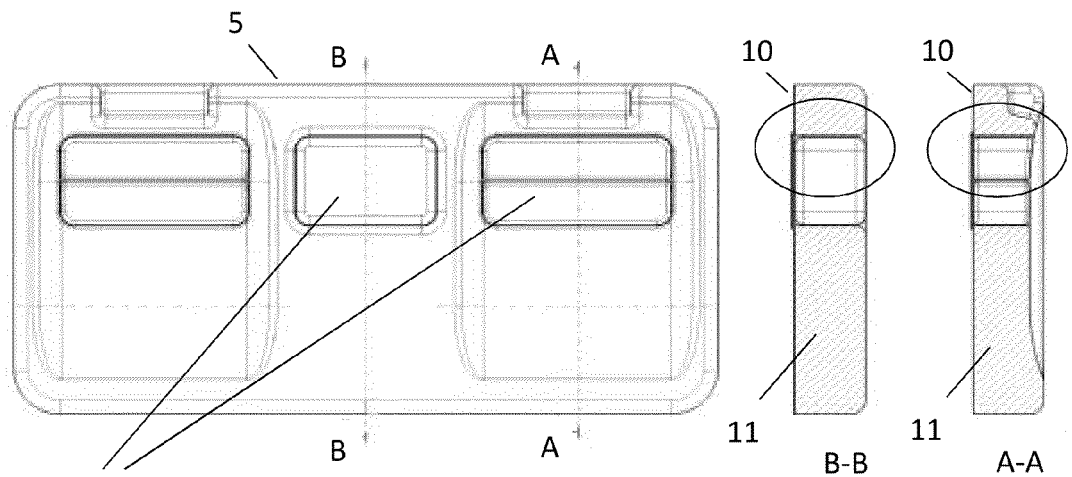
FIG. 2 illustrates a front view of the backrest of a seat bench in accordance with embodiments.
FIG. 3 illustrates a side view of the backrest of FIG. 2 in the section from B to B.
FIG. 4 illustrates a side view of the backrest of FIG. 2 in the section from A to A.

FIG. 2 illustrates a front view of the backrest 2 of a seat bench in accordance with embodiments. The backrest 2 has transparent regions 9.

Figure 5:
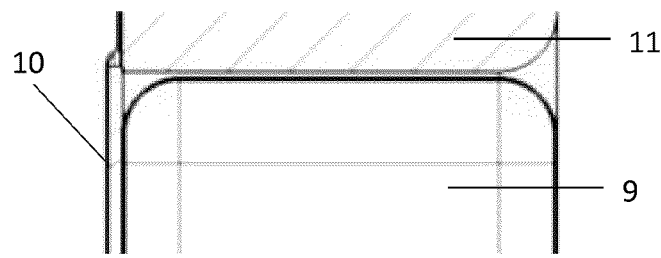
FIG. 5 illustrates a detailed view of FIG. 3.

FIG. 3 illustrates a side view of the backrest 2 of FIG. 2 in the section from B to B, i.e. in the central region of the backrest. The transparent region 9 also has upholstery 11. It is illustrated in the detailed view of FIG. 5 that, because of the arrangement of a transparent panel as the backrest rear wall 10, the backrest rear wall 10 is integrated in a stepped manner in said transparent region into the remaining backrest rear wall 10.

Figure 6:
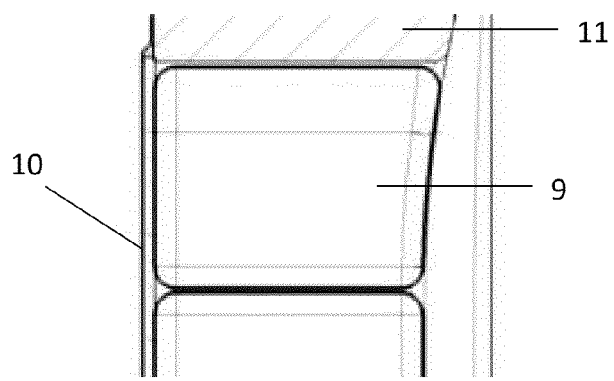
FIG. 6 illustrates a detailed view of FIG. 4.

FIG. 4 illustrates together with the detailed view thereof in FIG. 6 a lateral view of the backrest of FIG. 2, which is sectioned in a lateral seat region from A to A. The upholstery 11 is achieved here in the transparent region 9 by two separate, air-filled cushions.

Figure 7:
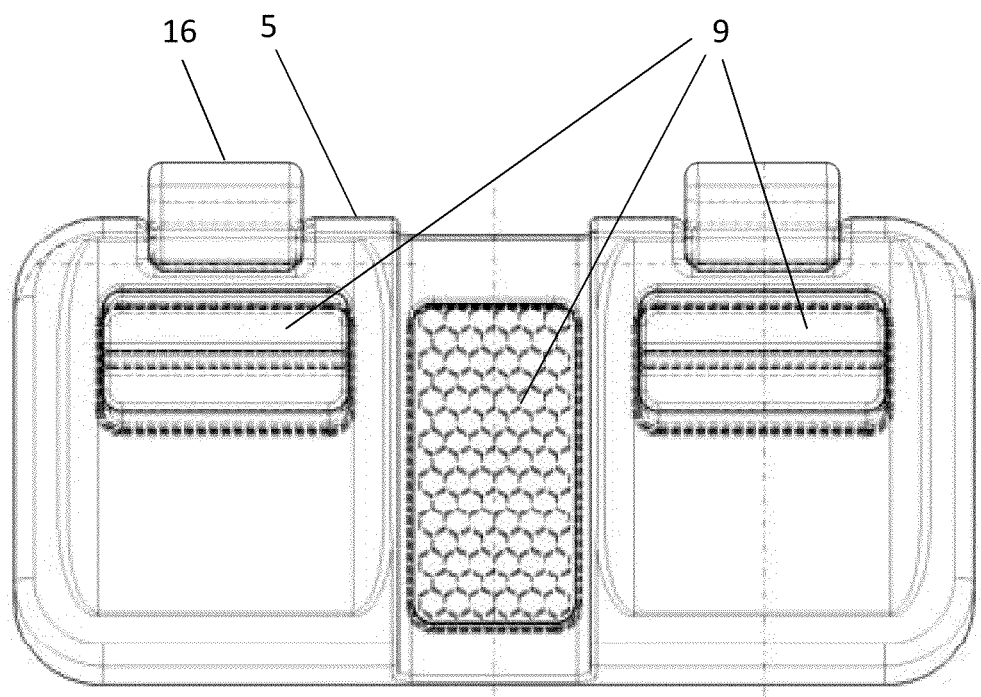
FIG. 7 illustrates a front view of the backrest of a seat bench in accordance with embodiments.

FIG. 7 illustrates a front view of the backrest of a further seat bench in accordance with embodiments. In this exemplary embodiment, the transparent region 9 in the central part of the backrest is implemented by way of a backrest rear wall with a honeycomb core. In this embodiment, head restraints 16 furthermore extend beyond the backrest upper edge 5. In contrast thereto, it is also possible, as illustrated for example in FIG. 2, to integrate head rest parts into the backrest 2, thus resulting in a backrest upper edge 5 which is as continuous as possible.

Figure 8:
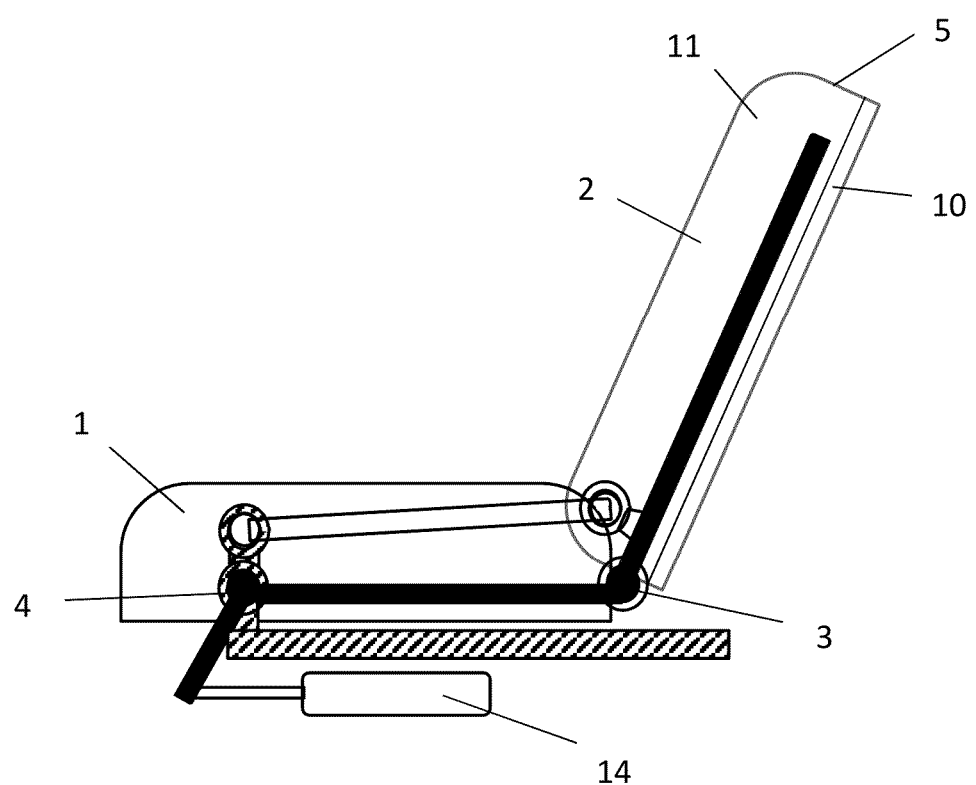
FIG. 8 illustrates a schematic illustration of a side view of a seat bench in accordance with embodiments.

FIG. 8 illustrates schematically a seat bench in accordance with embodiments in a side view. The seat bench comprises a seat surface 1 and a backrest 2. In this case, the backrest 2 is pivotable relative to the seat surface 1 about the first pivot axis 3 in the rear region of the seat surface 1. The seat surface 1 itself is mounted pivotably on the vehicle frame via the second pivot axis 4. The backrest 2 and the seat surface 1 are connected to each other in such a manner that an actuation via the servomotor 14 causes the backrest 2 and the seat surface 1 to be erected into an approximately vertical position. For this purpose, different folding mechanisms are known in the prior art, such as, for example, the illustrated use of an actuating rod or else the use of a chain or toothed belt system.

The backrest 2 is composed of a backrest rear wall 10 and upholstery 11. The backrest upper edge 5 is located at the upper end of the backrest 2, which end lies opposite the first pivot axis 3.

Figure 9A:
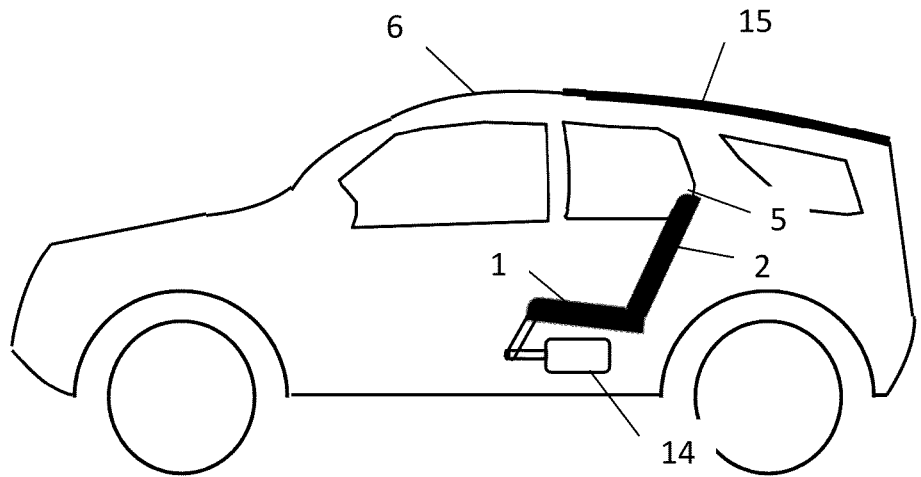
FIGS. 9a to 9c illustrate schematic illustrations of the seat bench of FIG. 1, between a transition from a normal position to a partition position.
Figure 9B:
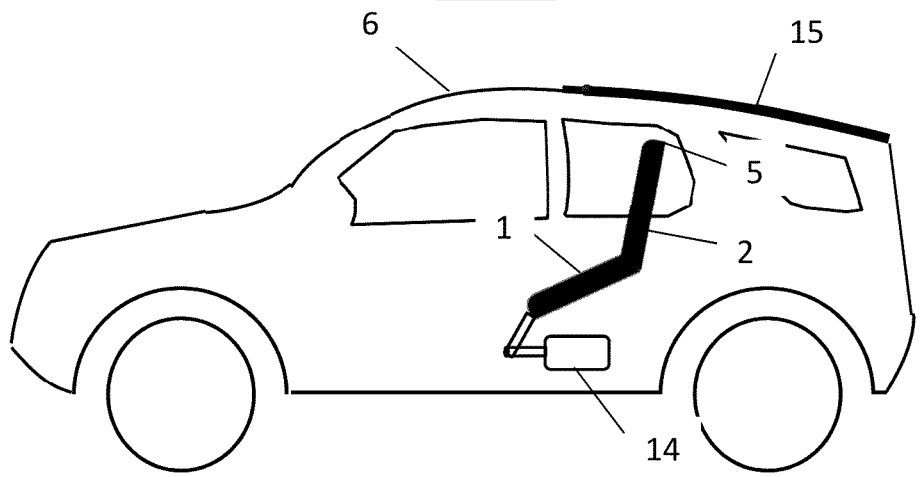
Figure 9C:
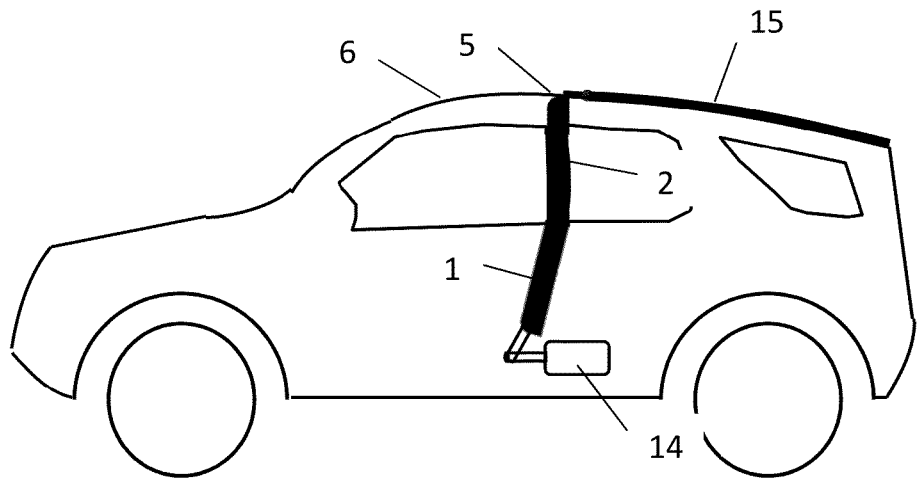

FIGS. 9a to 9c are schematic illustrations of the seat bench in accordance with embodiments in a motor vehicle, the illustrations showing a transition from the normal position in FIG. 9a via an intermediate position as illustrated in FIG. 9b to the partition position of FIG. 9c. In the partition position which is illustrated in FIG. 9c, the partition which includes the seat surface 1 and the backrest 2 extends as far as the roof 6 of the motor vehicle. A removable, displaceable and foldable roof element 15 is located behind the contact line between the backrest upper edge 5 and roof 6 in the direction of travel. In the illustrated embodiment, the entire rear roof region as far as the tailgate of the vehicle is removable. In the opposite direction, the partition can also be transferred again with the aid of the servomotor 14 from the partition position of FIG. 9c via the intermediate position of FIG. 9b into the normal position, i.e., the formation of the customary seat surface 1 and backrest 2 of FIG. 9a.

Figure 10:
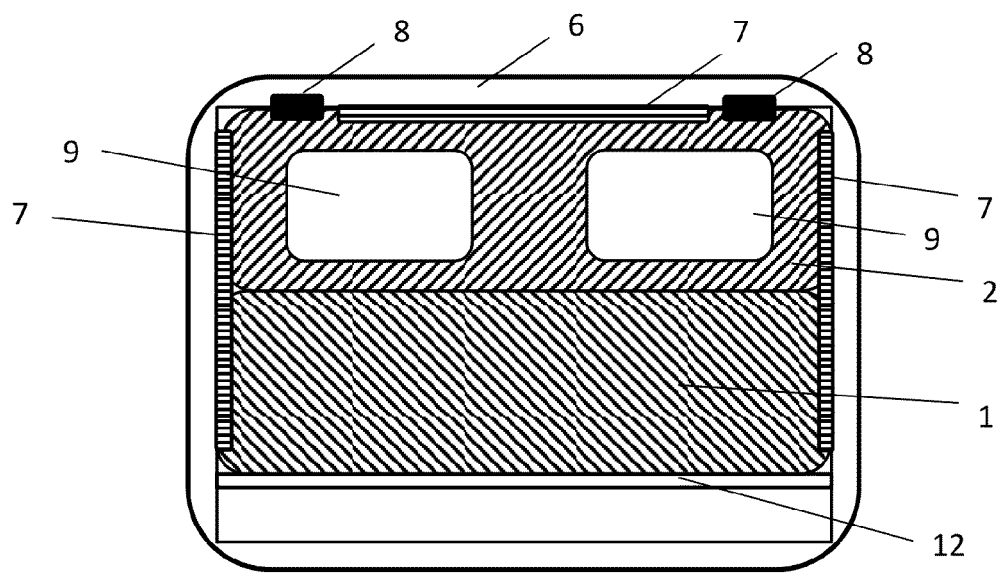
FIG. 10 illustrates a schematic illustration of a motor vehicle in accordance with embodiments with a seat bench in cross section.

FIG. 10 is a schematic illustration which shows a motor vehicle in accordance with embodiments with a seat bench in cross section. In this case, substantially the entire cross section of the vehicle is covered by the seat surface 1 and the backrest 2. The loading floor element 12 which is now raised is located in the lower region and, in the illustrated partition position, is located at the same height as a loading floor which is present in any case. Transparent regions 9 are formed in the backrest 2 by the fact that said regions do not have any upholstery or have transparent upholstery and a possibly present backrest rear wall is of transparent design. The backrest 2 is fixed to the roof 6 of the vehicle with the aid of fixing elements 8. Furthermore, sealing elements 7 are arranged between the seat surface 1 or the backrest 2 and the frame of the motor vehicle, i.e. the roof, the side walls and possibly, not illustrated, the loading floor element 12. The contact surfaces between the partition and the vehicle are thereby sealed.

Figure 11:
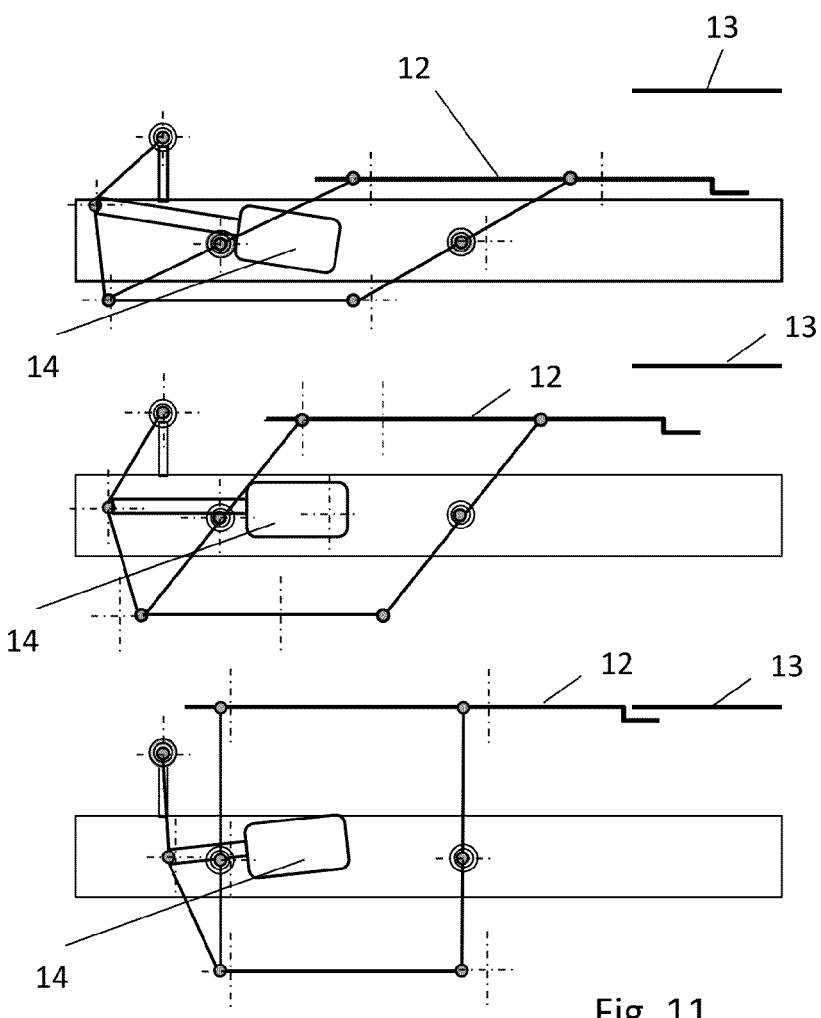
FIG. 11 illustrates a schematic sequence illustration which shows the raising of a loading floor element in three phases.

FIG. 11 finally illustrates the kinematics of raising the loading floor in a schematic sequence illustration. In the uppermost illustration of FIG. 11, the loading floor element 12 is still located significantly under the normal loading floor 13 which forms the floor of a loading compartment behind the seat bench. The loading floor element 12 is raised to the height of the loading floor 13 via the servomotor 14 and linkage correspondingly mounted on the vehicle, as illustrated at the bottom in FIG. 11.

In accordance with embodiments, a motor vehicle with a seat bench is provided in which both comfortable sitting on the seat bench and a good view from a front region into a rear region in the motor vehicle are made possible.

Although embodiments have been described herein, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A motor vehicle comprising:
a seat bench having a seat surface which lies in an approximately horizontal plane in a normal position and a backrest which lies in an approximately vertical plane in the normal position, the backrest having at least one transparent region configured to permit an occupant at a first region of the motor vehicle in front of the backrest in a direction of travel of the motor vehicle to view a second region of the motor vehicle behind the backrest in the direction of travel of the motor vehicle.

2. A motor vehicle comprising:
a seat bench which lies in an approximately horizontal plane in a normal position and a backrest which lies in an approximately vertical plane in the normal position, the backrest having at least one transparent region configured to permit an occupant at a first region of the motor vehicle in front of the backrest in a direction of travel of the motor vehicle to view a second region of the motor vehicle behind the backrest in the direction of travel of the motor vehicle, the backrest having a rear wall composed of a transparent material.

3. The motor vehicle of claim 2, wherein the rear wall comprises a transparent honeycomb core in the at least one transparent region.

4. The motor vehicle of claim 2, wherein the rear wall comprises the at least one transparent region.

5. The motor vehicle of claim 2, wherein the backrest comprises upholstery.

6. The motor vehicle of claim 5, wherein the upholstery is removeable in the at least one transparent region.

7. The motor vehicle of claim 5, wherein the upholstery comprises a transparent, air-filled cushion, in the at least one transparent region.

8. A motor vehicle comprising:
a seat bench which lies in an approximately horizontal plane in a normal position and a backrest which lies in an approximately vertical plane in the normal position, the backrest having at least one transparent region to permit an occupant at a first region of the motor vehicle in front of the backrest in a direction of travel of the motor vehicle to view a second region of the motor vehicle behind the backrest in the direction of travel of the motor vehicle,
wherein the seat surface and the backrest are configured for manipulation from the normal position into a partition position in which the backrest and the seat surface collectively form a partition which separates second region behind the partition in the direction of travel of the motor vehicle from the first region in front of the partition in the direction of travel of the motor vehicle.

9. The motor vehicle of claim 8, wherein in the partition position, the seat surface and the backrest are configured for manipulation to an at least approximately vertical position relative to a roof of the motor vehicle such that the backrest is spatially arranged above the seat surface.

10. The motor vehicle of claim 9, wherein in the partition position, an upper edge of the backrest is in contact with the roof of the motor vehicle.

11. The motor vehicle of claim 9, wherein:
the backrest is mounted pivotably on the seat surface via a first pivot axis in a rear region of the seat surface;
the seat surface is mounted pivotably on the vehicle frame via a second pivot axis in a front region of the seat surface; and
the seat surface and the backrest are pivotable about the first and second pivot axes into the partition position.

12. The motor vehicle of claim 9, wherein in the partition position:
an upper edge of the backrest extends over an entire width of the roof of the motor vehicle; and
the upper edge of the backrest is in contact over the entire width with the roof of the motor vehicle.

13. The motor vehicle of claim 9, wherein in the partition position, the partition covers an entire cross section of the motor vehicle.

14. The motor vehicle of claim 9, further comprising at least one sealing element arranged in an interior space of the motor vehicle, said sealing element configured to seal a contact region between the partition and the motor vehicle in the partition position.

15. The motor vehicle of claim 9, wherein the partition is configured to provide at least one of a soundproof, watertight and airtight partition between the first region and the second region.

16. The motor vehicle of claim 9, further comprising at least one fixing element arranged in an interior space of the motor vehicle, the fixing element being configured to fix at least one of the backrest and the seat surface in the partition position.

17. The motor vehicle of claim 9, wherein the roof of the motor vehicle comprises at least one of a removable roof element, a displaceable roof element and a foldable roof element which lies behind the partition in the direction of travel in the partition position.

18. The motor vehicle of claim 9, further comprising a loading floor element which, in the normal position of the seat bench, is located under the seat surface, and configured such that, in the partition position of the seat bench, lies in one plane with a loading floor of the motor vehicle.

19. The motor vehicle of claim 9, wherein the seat surface and the backrest are configured to be automatically manipulated into the partition position.

20. The motor vehicle of claim 19, wherein the loading floor element is configured to be automatically manipulated into a raised position simultaneously when the seat surface and the backrest are automatically manipulated adjustable into the partition position.

* * * * *